(12) United States Patent
Nakayama et al.

(10) Patent No.: US 6,735,046 B2
(45) Date of Patent: May 11, 2004

(54) NANO-MAGNETIC HEAD AND NANO-MAGNETIC HEAD DEVICE USING THE SAME

(75) Inventors: Yoshikazu Nakayama, 9-404, 14-2, Korigaoka 1-chome, Hirakata-city, Osaka 573-0084 (JP); Akio Harada, Osaka (JP)

(73) Assignees: Yoshikazu Nakayama, Osaka (JP); Daiken Chemical Co., Ltd., Osaka (JP)

( * ) Notice: Subject to any disclaimer, the term of this patent is extended or adjusted under 35 U.S.C. 154(b) by 349 days.

(21) Appl. No.: 09/990,259

(22) Filed: Nov. 21, 2001

(65) Prior Publication Data

US 2003/0095356 A1 May 22, 2003

(51) Int. Cl.[7] ............................. G11B 5/127; G11B 5/17
(52) U.S. Cl. .......................................................... 360/110
(58) Field of Search ................................. 360/123, 125, 360/127, 110

(56) References Cited

U.S. PATENT DOCUMENTS

| | | | |
|---|---|---|---|
| 3,156,919 A | * 11/1964 | Rutter | 29/603.2 |
| 4,677,512 A | * 6/1987 | Akiyama et al. | 360/110 |
| 5,331,491 A | * 7/1994 | Hayakawa et al. | 360/17 |
| 5,508,869 A | * 4/1996 | Nanjyo | 369/13.32 |
| 5,652,685 A | * 7/1997 | Ketchersid, III | 360/125 |
| 6,211,673 B1 | * 4/2001 | Gerber et al. | 324/260 |
| 6,233,206 B1 | * 5/2001 | Hamann et al. | 369/13.01 |
| 6,304,083 B1 | * 10/2001 | Owens | 235/449 |
| 2002/0054560 A1 | * 5/2002 | Boutaghou et al. | 369/244 |

FOREIGN PATENT DOCUMENTS

JP 2001/331906 A * 11/2001

OTHER PUBLICATIONS

Zettl, A. May 1996. "Non–Carbon Nanotubes". Advanced Materials v. 8 No. 5 p. 443–445.*
Nakayama, Y. Dec. 2000. "Synthesis of carbon nanostructures focused on carbon nanotubes". Japan Soc. Appl. Phys. Oyo Buturi v. 69 No. 12 p. 1429–33.*
Khizroev, S. K. et al. Jul. 1998. "MFM Quantification of Magnetic Fields Generated by Ultra–Small Single Pole Perpendicular Heads". IEEE Transactions on Magnetics, v. 34, N. 4, p. 2030–2032.*

* cited by examiner

*Primary Examiner*—Julie Anne Watko
(74) *Attorney, Agent, or Firm*—Koda & Androlia

(57) ABSTRACT

A nano-magnetic head for inputting and outputting magnetic signals with nano-region precision on a magnetic recording medium such as magnetic tapes, magnetic cards, magnetic disks, magnetic drums, etc. The nano-magnetic head uses a nanotube with its base end portion fastened to a holder that is at an end of an AFM cantilever. The tip end portion of the nanotube protrudes from the holder, and a nanocoil is wound around the outer circumference of the tip end portion of the nanotube so that signals are inputted and outputted at both ends of the nanocoil. By way of lining up ferromagnetic metal atoms in the hollow portion of the nanotube, it is possible to strengthen the magnetic signal. The nano-magnetic head is combinable with a signal controller, thus forming a nano-magnetic head device.

8 Claims, 4 Drawing Sheets

NANO-MAGNETIC HEAD AND NANO-MAGNETIC HEAD DEVICE USING THE SAME

BACKGROUND OF THE INVENTION

1. Field of the Invention

The present invention relates to a nano-magnetic head that uses a nanotube being capable of inputting and outputting magnetic signals with nano-region precision on a magnetic recording medium. The present invention further relates to a nano-magnetic head device equipped with a signal controller that inputs and outputs signals to and from a nano-magnetic head respectively.

2. Prior Art

Generally, a magnetic head is constructed from a core and a coil. The core has a gap between magnetic poles, and the coil is wound around the core. A magnetic recording device is constituted by disposing this gap between magnetic poles so that the gap contacts a magnetic recording medium such as a magnetic tape, magnetic card, magnetic disk, magnetic drum and other magnetic substance. When a signal current flows through the coil, magnetic flux is generated in the ring-form core. A part of this magnetic flux leaks into the magnetic recording medium from the gap between magnetic poles, and information is magnetically recorded in the molecules of the magnetic material of the magnetic recording medium by this leakage magnetic flux.

Conversely, when the magnetic recording medium on which magnetic recording has been performed is moved relative to the gap between magnetic poles, a signal current is generated in the coil by electromagnetic induction. Magnetic information is played back by way of amplifying this signal current.

As seen from the above, a magnetic head is a device that magnetically records information on a magnetic recording medium and plays back magnetic information from such a magnetic recording medium.

The size of the minimal units of magnetic information recorded on the magnetic recording medium varies directly depending upon the size of the gap between magnetic poles formed in the core. Accordingly, in order to increase the magnetic recording density, it is necessary to design the magnetic head so that the core and the gap between the magnetic poles of the core are as small as possible in size. However, as along as the formation of the core and the gap between the magnetic poles depends on mechanical working or other physical working, there are size limits that restrict the miniaturization of these members. Accordingly, not only the development of magnetic substances but also the development of core materials is an urgent task for increasing magnetic recording density.

SUMMARY OF THE INVENTION

Accordingly, it is an object of the present invention to provide a nano-magnetic head that reduces the size of the minimal units of magnetic information to the nano-scale in a single stroke, thus providing a great increase in magnetic recording density.

It is another object to provide a nano-magnetic head device that uses such a nano-magnetic head.

The above object is accomplished by a unique structure for a nano-magnetic head that is characterized in that the base end portion of a nanotube is fastened to a holder so that the tip end portion of this nanotube protrudes from the holder, a nanocoil is wound around the outer circumference of this tip end portion of the nanotube, and signals are inputted and outputted at both ends of this nanocoil.

The above object is accomplished by another unique structure for a nano-magnetic head that is characterized in that the base end portion of a nanotube is fastened to a holder so that the tip end portion of this nanotube protrudes from the holder, a microcoil is wound around the outer circumference of this holder, and signals are inputted and outputted at both ends of this microcoil.

In the above nano-magnetic head, the holder is a protruding portion of an AFM (Atomic Force Microscope) cantilever, where the protruding portion is also called "pyramid portion" which is sometimes used below in the present specification.

The above object is accomplished by still another unique structure for a nano-magnetic head that is characterized in that the base end portion of a nanotube is fastened to a holder so that the tip end portion of this nanotube protrudes from the holder, a microcoil is wound around the outer circumference of a main body portion that supports the holder, and signals are inputted and outputted at both ends of this microcoil.

In this nano-magnetic head, the holder is the protruding portion of an AFM cantilever, and the main body portion is the cantilever portion of the AFM cantilever.

Furthermore, in the present invention, ferromagnetic metal atoms can be installed in the hollow portion of the nanotube.

The above object is further accomplished by a unique structure for a nano-magnetic head device that comprises the nano-magnetic head as described above and a signal controller that inputs and outputs signals to and from this nano-magnetic head, respectively, so that the nano-magnetic head device performs magnetic writing in a nano-region of a magnetic recording medium and reads magnetic record from this nano-region.

DETAILED DESCRIPTION OF THE INVENTION

Figure 1:
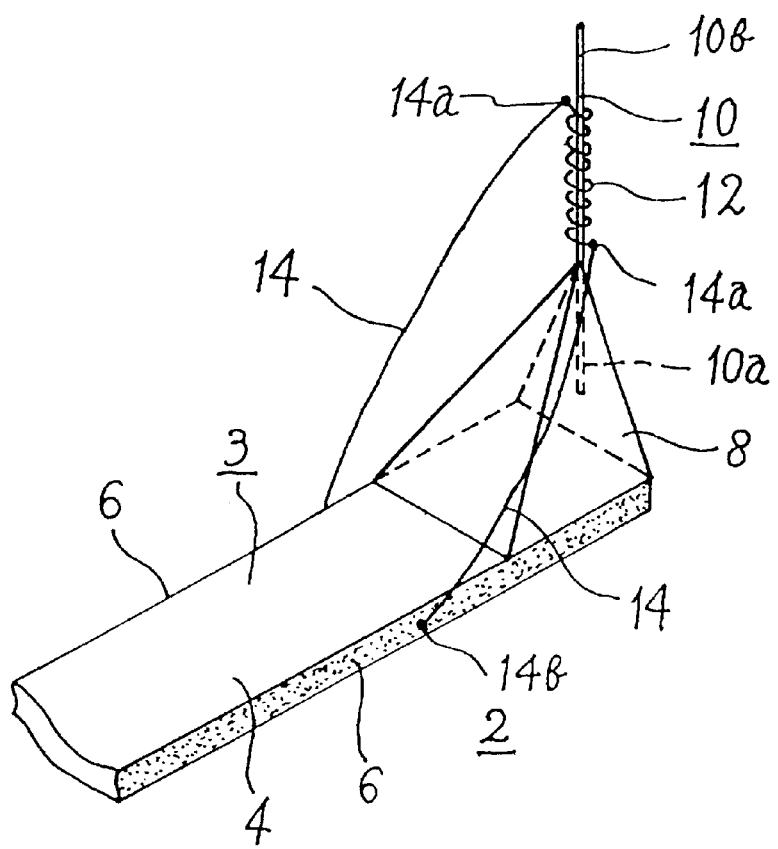
FIG. 1 is a perspective view of the first embodiment of the nano-magnetic head of the present invention.

The inventors of the present application conducted diligent research in order to develop a magnetic head that reduces the size of the minimal units of magnetic recording to a nanometer scale. As a result of this research, the inventors successfully conceived of a nano-magnetic head that allows magnetic input and output to and from a magnetic recording medium by means of the tip end of a nanotube. This is accomplished by using a nanotube such as a carbon nanotube as the core of the magnetic head, by using a nanocoil or microcoil as the coil, and by passing the nanotube through the hollow portion of the coil.

More specially, in the present invention, electrical signals are inputted from both ends of the nanocoil or microcoil, the magnetic flux formed by such a coil is caused to leak from the tip end of the nanotube, and magnetic recording is performed on a magnetic recording medium by means of this leakage magnetic flux. As a result, the size of the minimal units of magnetic recording is reduced to a value that is approximately equal to the cross-sectional diameter of the nanotube.

The reason that a nanotube is most effective as the core is the extremely small size of the cross-sectional diameter of such a nanotube. Nanotubes that can be used in the present invention include carbon nanotubes. The cross-sectional diameters of carbon nanotubes (also called CNT) are distributed through a range of approximately one nanometer to several tens of nanometers. The axial lengths of such carbon nanotubes range from nanometer size to micron size. Accordingly, by way of using a nanotube, which has such a high aspect ratio, as a probe needle, it is possible to perform magnetic recording on the nanometer scale, thus accomplishing an ultra-high magnetic recording density.

After carbon nanotubes, BCN type nanotubes were created. For example, a mixed powder of amorphous boron and graphite was packed into a graphite rod, and this mixture was evaporated in a nitrogen gas atmosphere. Alternatively, a sintered BN rod was packed into a graphite rod, and this was evaporated in a helium gas atmosphere. As another alternative, an arc discharge was performed in a helium gas atmosphere by way of using $BC_4N$ as an anode and graphite as a cathode. BCN type nanotubes in which some of the carbon atoms in CNT were replaced by B atoms and N atoms were synthesized by these methods.

Furthermore, BN type nanotubes were also created. These are nanotubes that contain almost no C atoms. For example, CNT and powdered $B_2O_3$ is placed in a crucible and heated in nitrogen gas. As a result, BN type nanotubes, in which almost all of the C atoms in the CNT (carbon nanotubes) are replaced by B atoms and N atoms, are obtained.

Since both BCN type nanotubes and BN type nanotubes have a physical structure that is more or less similar to that of CNT, the ratio of the axial length to the diameter, i.e., the aspect ratio, is also extremely high in such nanotubes. Accordingly, not only carbon nanotubes but also nanotubes in general such as BCN type nanotubes or BN type nanotubes, etc. can be utilized as nanotubes in the present invention.

Generally, a hollow portion is formed in the interior of a nanotube. In order to cause leakage of the magnetic flux formed by the coil from the tip end of the nanotube, it is desirable to dispose atoms of a ferromagnetic metal such as iron, cobalt, nickel, and the like in the hollow portion of the nanotube. By way of thus disposing atoms of a ferromagnetic metal, the leakage magnetic flux is constricted by these atoms, and the cross-sectional diameter of the leakage magnetic flux becomes close to the cross-sectional diameter of the nanotube, thus making it possible to reduce the size of the magnetic recording units to the nanometer scale. The theoretical minimum size of the cross-sectional diameter of a nanotube is approximately one (1) nm. Therefore, the minimum size of the units of magnetic recording can also be reduced to 1 nm.

The injection of ferromagnetic metal atoms in the interior of a nanotube can easily be accomplished. By way of merely cutting a nanotube that is closed at both or by opening a nanotube at its tip end in a vapor of such a metal, the spontaneous advance of the metal atoms into the hollow portion (as if the atoms are being sucked in) is observed. The number of ferromagnetic metal atoms to be injected depends on the axial length of the nanotube. In order to cause the leakage of magnetic flux from the tip end of the nanotube, it is desirable to fill at least the tip end portion of the nanotube with ferromagnetic metal atoms.

Even in cases where ferromagnetic metal atoms are not lined up in the hollow portion of the nanotube, a nano-magnetic head can be constructed because the coil diameter is small. However, since the magnetic flux spreads out to some extent, it is necessary to perform magnetic input and output by approaching the tip end of the coil to the magnetic recording medium as closely as possible.

Coils that can be used in the nano-magnetic head of the present invention include microcoils and nanocoils. Microcoils were discovered first, and a method for the manufacture of such microcoils was established. Then, nanocoils were discovered, and a method for mass-producing such nanocoils was established by the present inventors.

Methods of mass production of nanocoils and microcoils will be described below.

In 1990, Motojima et al. (S. Motojima, M. Kawaguchi, K. Nozaki and H. Iwanaga, Appl. Phys. Lett., 56 (1990) 321) discovered an efficient method for manufacturing carbon microcoils; and as a result of subsequent research, these researchers established a manufacturing method that has reproducibility. In this method, a graphite substrate coated with a powdered Ni catalyst is placed inside a horizontal type externally heated reaction tube made of transparent quartz. A raw-material gas is next introduced perpendicularly onto the surface of the substrate from a raw-material gas introduction port located in the upper portion of the reaction tube. This raw-material gas is a mixed gas of acetylene, hydrogen, nitrogen and thiophene. The exhaust gas is discharged from the bottom portion of the reaction tube.

Impurities such as sulfur, phosphorus, and the like are indispensable. If the amounts of these impurities are too large or too small, carbon microcoils will not grow. For example, if thiophene that contains sulfur is added at the rate of 0.24% relative to the total gas flow, the coil yield reaches a maximum, at a value of approximately 50%. The reaction temperature is approximately 750 to 800° C.

The diameter of the fibers constituting such carbon microcoils is 0.01 to 1 $\mu$m, the external diameter (outside diameter) of the coils is 1 to 10 $\mu$m, the coil pitch is 0.01 to 1 $\mu$m, and the coil length is 0.1 to 25 mm. Such carbon microcoils have a completely amorphous structure and have superior physical properties such as electromagnetic wave absorption characteristics, etc., so that these microcoils show promise as electromagnetic wave absorbing materials.

In 1991, carbon nanotubes were discovered. Spurred by this discovery, research concerning carbon coils on the nanometer scale, i.e., carbon nanocoils, was initiated. The reason for this was that on the nanometer scale, there was a possibility that new physical property might be discovered, so that such nanocoils showed promise as new materials in electronics and engineering in the nanometer region. However, the development of such carbon nanocoils was not easy.

In 1994, Amelinckx et al. (Amelinckx, X. B. Zhang, D. Bernaerts, X. F. Zhang, V. Ivanov and J. B. Nagy, SCIENCE, 265 (1994) 635) succeeded in producing carbon nanocoils. It was also demonstrated that while carbon microcoils are amorphous, carbon nanocoils have a graphite structure. Various types of carbon nanocoils were manufactured, and the minimum external diameter of these nanocoils was extremely small, i.e., approximately 12 nm. However, the yield of coils was small, and this method was not able to be used for industrial mass production. Thus, a more efficient method of manufacture was sought.

In the manufacturing method used by the above-described researchers, a metal catalyst such as Co, Fe or Ni is formed into a fine powder, and the area around this catalyst is heated to a temperature of 600 to 700° C. Further, an organic gas such as acetylene or benzene is caused to flow through so that the gas contacts the catalyst, thus decomposing these organic molecules. The substance produced as a result consists of carbon nanotubes with a graphite structure, and the shapes of these nanotubes are linear, curvilinear, planar spiral, coil form, etc. In other words, carbon nanocoils were only produced by chance, and the coil yield was small.

In 1999, Li et al. (W. Li, S. Xie, W. Liu, R. Zhao, Y. Zhang, W. Zhou and G. Wang, J. Material Sci., 34 (1999) 2745) succeeded again in producing carbon nanocoils. In the manufacturing method used by these researchers, a catalyst formed by covering the outer circumference of a graphite sheet with iron particles was centered, and the area around this catalyst was heated to 700° C. by means of a nichrome wire. A mixed gas consisting of 10% acetylene and 90% nitrogen by volume was caused to flow through so that this gas contacted the catalyst. The flow rate of this gas was set at 1000 cc/min. The carbon nanocoils that were produced had various external diameters. The diameter of the smallest nanocoils was 20 nm or 22 nm. However, this manufacturing method also showed a small coil production rate and was extremely inadequate as an industrial production method.

Under these circumstances, an industrial mass production method for carbon nanocoils was established by the inventors of the present application, and a patent application for this method has was filed as Japanese Patent Application No. 11-377363. In this method, indium-tin-iron type catalyst is placed inside a reaction vessel, and the area in the vicinity of this catalyst is heated to a temperature exceeding the temperature at which the hydrocarbon used as a raw material is decomposed by the action of the catalyst. Further, a hydrocarbon gas is caused to flow through in such a manner that the gas contacts the catalyst, so that carbon nanocoils are grown on the surface of the catalyst while the hydrocarbon is decomposed in the vicinity of the catalyst. With this method, countless carbon nanocoils are densely grown on the surface of the indium-tin-iron type catalyst. The production rate as calculated from the amount of hydrocarbon gas is estimated to have an efficiency of approximately 95%.

Microcoils and nanocoils that can be used in the present invention are not limited to carbon microcoils and carbon nanocoils. BN type coils or BCN type coils in which the C atoms of these carbon coils are replaced by B atoms or N atoms may also be used. The surface of the coil used may also be coated with a metal, or the coil may be doped with metal atoms, in order to ensure the electrical conductivity of the coil because electrical signals are inputted into or outputted from the coil.

In the present invention, the holder to which the nanotube is fastened is, for example, the protruding portion used for measurement in an AFM cantilever. This protruding portion is ordinarily called a pyramid portion. The pyramid portion may have the shape of a circular cone, triangular pyramid, square pyramid, etc. In other words, the term "pyramid" is a collective name for all shapes that are used in AFM cantilevers. The main body portion to which the holder is fastened is, for example, the cantilever portion of an AFM cantilever. Indeed, besides AFM cantilevers, holders or other members used in other scanning type microscopes such as STM (Scanning Tunnel Microscope) can be used also. Furthermore, it is possible to make a main body portion and holder for exclusive use in a nano-magnetic head and to fasten the nanotube to this holder.

The nano-magnetic head and nano-magnetic head device of the present invention will be described below in detail with reference to the accompanying drawings.

FIG. 1 is a perspective view of a first embodiment of the nano-magnetic head of the present invention. A commercially marketed AFM cantilever is deliberately used. The nano-magnetic head 2 includes an AFM cantilever 3, a nanotube 10, and a nanocoil 12.

The AFM cantilever 3 is comprised of a long cantilever portion 4 and a pyramid portion 8 that protrudes from the tip end of the cantilever portion 4. Electrode films 6 are formed on both side edges of the cantilever portion 4. As described above, one example of the main body portion of the present invention is the cantilever portion 4, and one example of the holder is the pyramid portion 8. The base end portion 10a of the nanotube 10 is fastened to the surface of the pyramid portion 8, and the tip end portion 10b of the nanotube 10 protrudes from the pyramid portion 8.

The base end portion 10a of the nanotube 10 is fastened to the surface of the pyramid portion 8 by a method in which surface of the base end portion 10a is coated with a carbon coating film. In another method, the base end portion 10a is thermally fused to the pyramid portion 8. Electron beam irradiation or electric current heating can be used for such thermal fusion.

The nanocoil 12 is disposed so that this nanocoil is wound around the tip end portion 10b of the nanotube 10. Both ends of the nanocoil 12 are fused by means of an electron beam to the ends of lead wires 14 that use nanotubes, thus forming contacts 14a. The other ends of the nanotube lead wires 14 are joined to the electrode films 6, thus forming contacts 14b.

Figure 2:
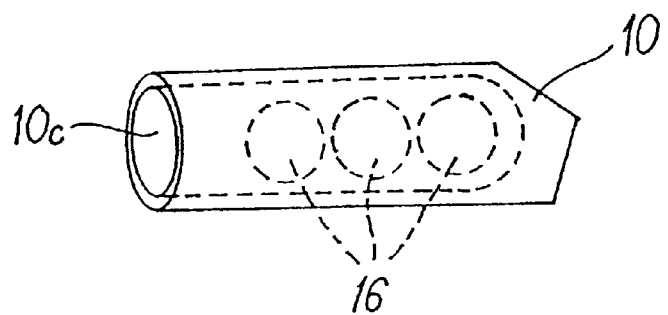
FIG. 2 is a simplified perspective view of the nanotube which has ferromagnetic metal atoms disposed in its interior.

FIG. 2 is a simplified perspective view of a nanotube which has ferromagnetic metal atoms disposed in its interior. Here, numerous ferromagnetic metal atoms 16 are disposed in the hollow portion 10c of the nanotube 10. In a metal vapor, a nanotube 10 which is closed at both ends is cut or the tip end portion of the nanotube 10 is opened, thus allowing metal atoms to be sucked into the hollow portion 10c of the nanotube 10 from its open end surface. Furthermore, by way of producing a nanotube 10 in a metal vapor, it is possible to obtain a nanotube 10 in which metal atoms are present in the hollow portion 10c.

Figures 3A, 3B, 3C, 3D:
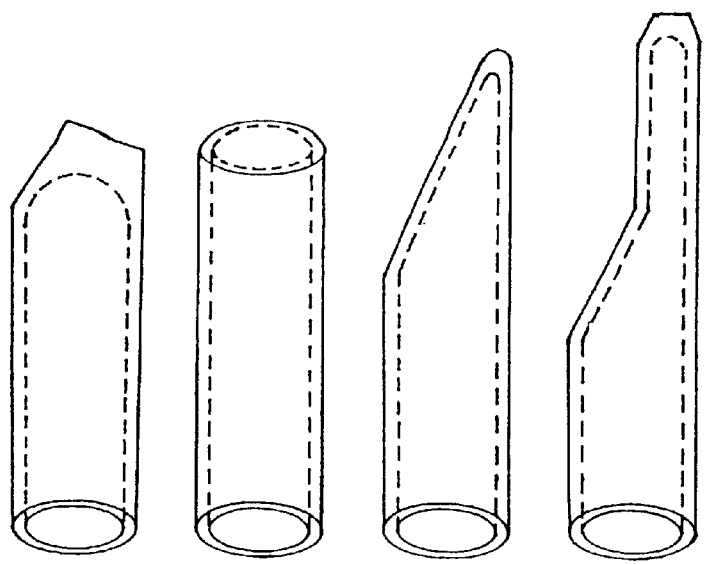
FIGS. 3A through 3D show various tip end shapes of carbon nanotubes used in the present invention.

FIGS. 3A–D show various tip end shapes of carbon nanotubes. In FIG. 3A, the tip end is closed by a polyhedron. In FIG. 3B, the tip end is open. In FIG. 3C, the tip end is closed by a circular cone. In FIG. 3D, the tip end is closed by a beak shape. By way of using the portion in which the tip end is closed as the tip end portion 10b of the nanotube 10, no oxidation of the enclosed ferromagnetic metal atoms 16 occurs, and a long useful life is obtained.

Figure 4:
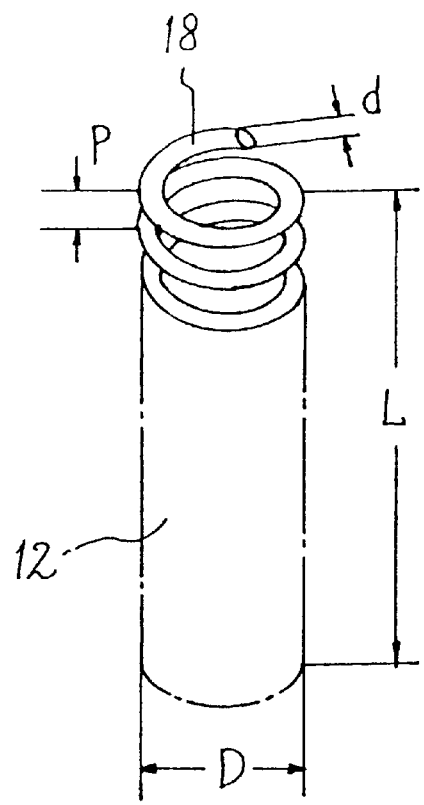
FIG. 4 is a perspective view of a nanocoil used in the present invention.

FIG. 4 is a perspective view of a nanocoil. In the shown example, the nanocoil 12 is formed from a single carbon fiber 18. However, a composite nanocoil in which two or more carbon fibers 18 are entwined in the form of a coil while being carefully synchronized may also be used in the present invention.

The carbon fiber 18 is a long carbon nanotube. In regard to the size of the nanocoil 12, the diameter d of the fiber 18 is generally several nanometers to several tens of nanometers, the coil diameter D is several tens of nanometers to several hundred nanometers, the pitch P is several nanometers to several tens of nanometers, and the axial length L is several microns to several tens of millimeters.

The name "nanocoil" originates in the fact that the coil diameter D is a nano-size diameter (D<1000 nm). It goes without saying that in cases where the coil diameter D is one micron or greater, i.e., a micron-size diameter, then the coil is called a microcoil.

Figure 5:
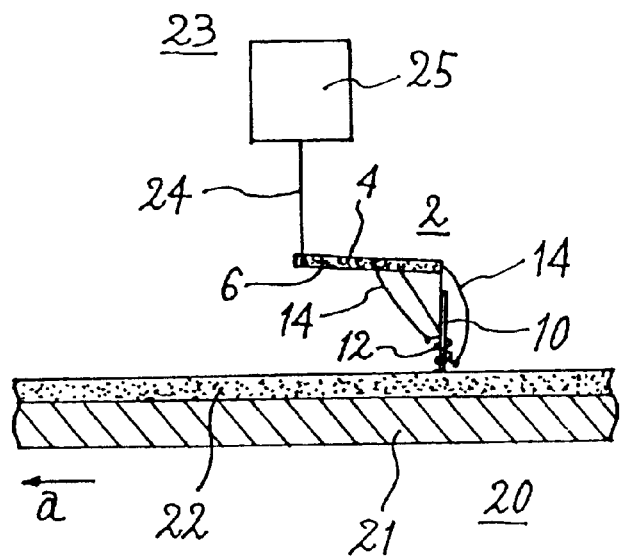
FIG. 5 is a diagram that shows the conditions of use of the nano-magnetic head device of the present invention.

FIG. 5 shows the nano-magnetic head device of the present invention. This nano-magnetic head device 23 is comprised of the nano-magnetic head 2 shown in FIG. 1, connecting wires 24 which are connected to the electrode films 6 of the cantilever portion 4, and a signal controller 25 to which the connecting wires 24 are connected. The magnetic recording medium 20 is obtained by forming a magnetic film 22 on a substrate 21.

First, a case in which the magnetic writing (magnetic input) is performed on the magnetic film 22 with the nano-magnetic head device as described above will be described.

The tip end of the nanotube 10 is caused to approach the magnetic film 22, and an electrical signal is sent from the signal controller 25. This electrical signal flows through the nanocoil 12 and generates magnetic flux inside the nanocoil 12. The magnetic flux leaks from the tip end of the nanotube 10 and is recorded on the magnetic film 22 as magnetic information. When the magnetic recording medium 20 is moved in the direction indicated by arrow a, information is continuously and magnetically recorded on the magnetic film 22.

On the other hand, magnetic reading (magnetic output) is performed from the magnetic film 22 in the following manner.

The tip end of the nanotube 10 is caused to approach the magnetic film 22, and the magnetic recording medium 20 is moved in the direction indicated by arrow a. The magnetic lines of force of the magnetic information recorded on the magnetic film 22 enter the interior of the nanotube 10, so that an induced electromotive force is generated in the nanocoil 12 by electromagnetic induction. This induced electromotive force enters the signal controller 25 via the connecting wires 24, and the magnetic information is continuously played back.

Figure 6:
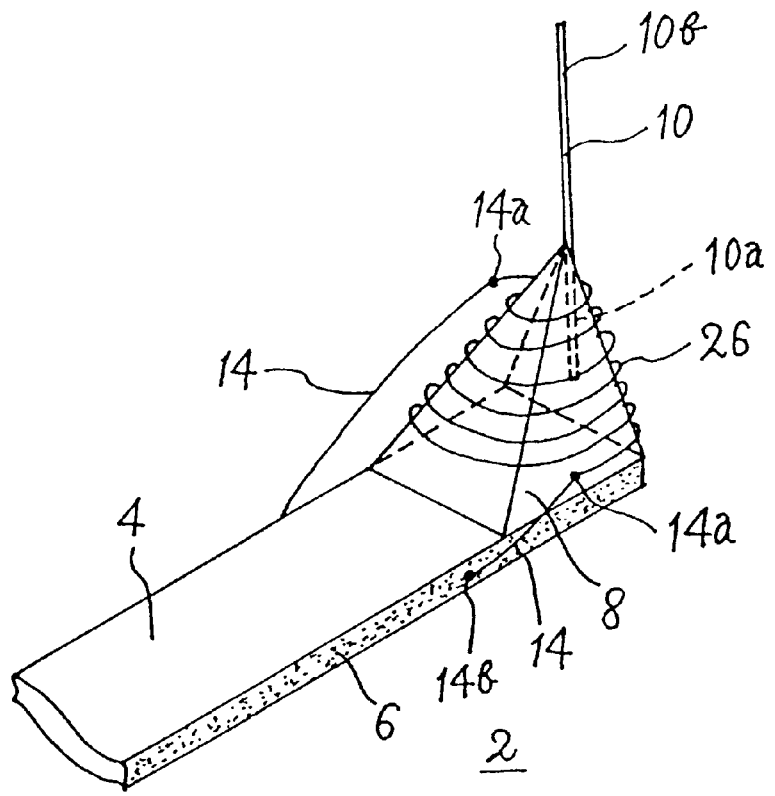
FIG. 6 is a perspective view of the second embodiment of the nano-magnetic head of the present invention.

FIG. 6 shows the second embodiment of the nano-magnetic head of the present invention. In this embodiment, instead of the nanocoil 12, a microcoil 26 is used.

The microcoil 26 is wound around a somewhat larger pyramid portion 8 (which is one example of a holder). A microcoil 26 that is large enough to allow the entry of the pyramid portion 8 therein is selected and used. The other elements are substantially the same as those shown in FIG. 1. The same elements are labeled with the same reference numerals, and a description of these elements is omitted.

Figure 7:
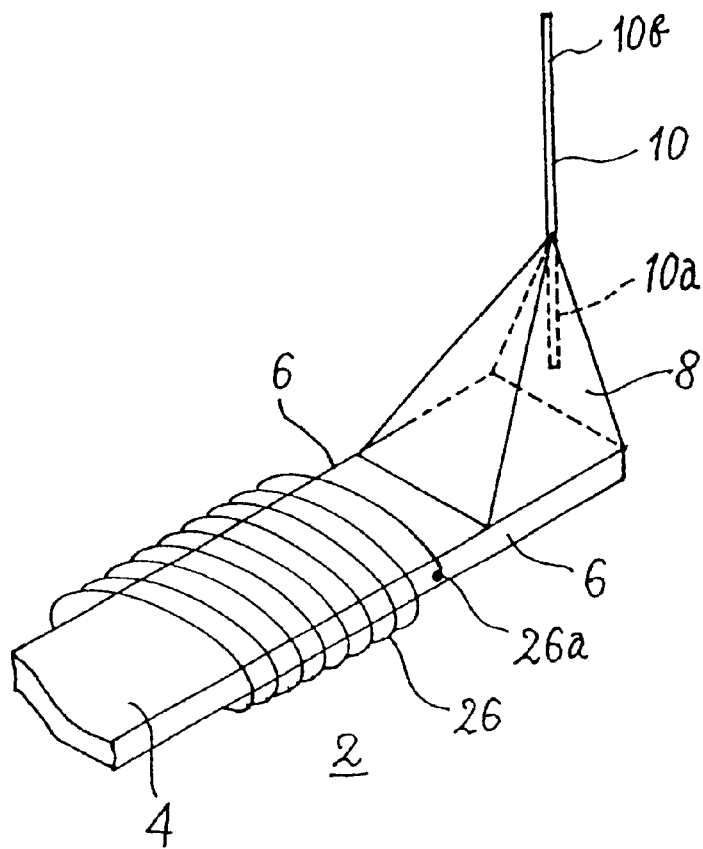
FIG. 7 is a perspective view of the third embodiment of the nano-magnetic head of the present invention.

FIG. 7 shows the third embodiment of nano-magnetic head of the present invention. In this embodiment as well, a microcoil 26 is used instead of the nanocoil 12.

The microcoil 26 is wound around a cantilever portion 4 (which is one example of the main body portion). In this third embodiment, nanotube lead wires 14 are not used. Instead, both ends 26a of the microcoil 26 are fastened by being directly fused to the electrode films 6. The other elements are the substantially the same as those shown FIG. 1. The same elements are labeled with the same reference numerals, and a description of such elements is omitted.

Figure 8:
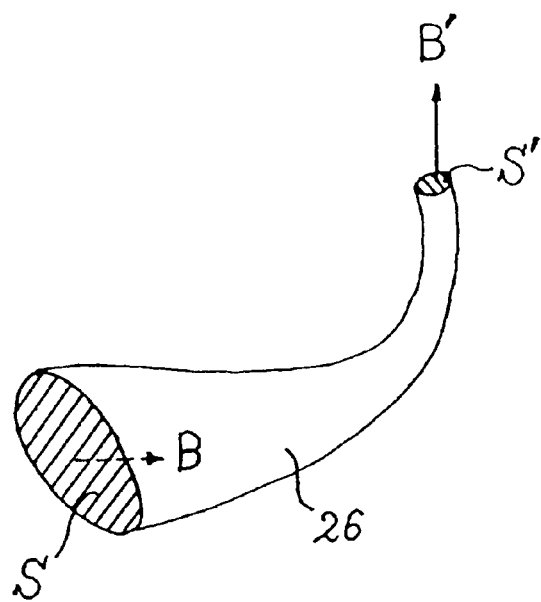
FIG. 8 is a model diagram of the strengthening of the magnetic signal that is obtained when a microcoil is used.

FIG. 8 is a model diagram of the strengthening of the magnetic signal that is obtained in a case where a microcoil is used.

In FIGS. 6 and 7, the microcoil 26 is in a position where it is separated from the nanotube 10. However, the magnetic flux formed by the microcoil 26 leaks from the tip end of the nanotube. Accordingly, where S is the cross-sectional area of the microcoil 26, B is the magnetic flux density that is generated, S' is the cross-sectional area of the nanotube 10 and B' is the magnetic flux density that flows out, then S×B=S'×B' is obtained from the law of continuity of magnetic flux, so that B' can be simply calculated as follows: B'=(S/S')B. In other words, in cases where a microcoil is used, the leakage magnetic flux density B' is strengthened compared to the generated magnetic flux density B by an amount equal to the area ratio. Accordingly, this is advantageous for writing on the magnetic recording medium 20.

Nano-magnetic head devices shown in FIG. 5 can be constructed by combining the nano-magnetic heads shown in FIGS. 6 and 7 with the signal controller 25, so that magnetic writing and magnetic read-out is performed on and from a magnetic recording medium respectively.

The present invention is not limited to the embodiments described above. Various modifications, alterations, etc. contained within the technical concept of the present invention are in the scope of the present invention.

As seen from the above, in the present invention, a nano-magnetic head is constructed by winding a nanocoil around a nanotube. Accordingly, a nano-size information unit almost equal to the cross-sectional diameter of the nanotube can be written and read out on and from a magnetic recording medium as the minimal unit of magnetic information. Thus, an ultra-high recording density can be obtained.

Furthermore, in the present invention, a microcoil is wound around the outer circumference of a holder so as to perform write-in and read-out using a nanotube. Accordingly, it is possible not only to realize an ultra-high recording density but also to amplify the magnetic signal during writing by an amount equal to the cross-sectional area ratio of the microcoil and nanotube.

Further, the pyramid portion of an AFM cantilever is used as the holder to which the nanotube is fastened. Thus, a highly practical nano-magnetic head is realized at a low cost.

Furthermore, in the present invention, a microcoil is wound around the outer circumference of the main body portion, and writing and reading is accomplished by means of a nanotube. Accordingly, it is possible not only to realize an ultra-high recording density but also to amplify the magnetic signal during writing by an amount equal to the cross-sectional area ratio of the microcoil and nanotube.

In the present invention, a microcoil can be wound around a cantilever. Accordingly, a highly practical nano-magnetic head that uses a commercially marketed AFM cantilever can be realized at a low cost. The magnetic signal used for writing can be amplified by an amount that is equal to the cross-sectional area ratio of the microcoil and nanotube.

In addition, ferromagnetic metal atoms can be installed in the hollow portion of the nanotube. With this structure, it is possible not only to strengthen the magnetic flux density but also to achieve a narrow constriction of the magnetic flux that is inputted and outputted into and from the nanotube, respectively. Thus, a high-performance nano-magnetic head can be provided.

Furthermore, in the nano-magnetic head device of the present invention, the nano-magnetic head is operated by means of a signal controller. The nano-magnetic head device of the present invention performs magnetic writing in a nano-region on a magnetic recording medium and also performs reading of the magnetic record written in such a nano-region.

What is claimed is:

1. A nano-magnetic head comprising:
   a nanotube fastened at a base end portion thereof to a holder so that a tip end portion of said nanotube protrudes from said holder, and
   a nanocoil wound around an outer circumference of said tip end portion of said nanotube so that signals are inputted and outputted at both ends of said nanocoil.

2. The nano-magnetic head according to claim 1, wherein said holder is a pyramid portion of an AFM cantilever.

3. A nano-magnetic head comprising:
   a nanotube fastened at a base end portion thereof to a holder so that a tip end portion of said nanotube protrudes from said holder, and
   a microcoil wound around an outer circumference of said holder so that signals are inputted and outputted at both ends of said microcoil.

4. The nano-magnetic head according to claim 3, wherein said holder is a pyramid portion of an AFM cantilever.

5. A nano-magnetic head comprising:
   a nanotube fastened at a base end portion thereof to a holder so that a tip end portion of said nanotube protrudes from said holder, and
   a microcoil wound around an outer circumference of a main body portion that supports said holder so that signals are inputted and outputted at both ends of said microcoil.

6. The nano-magnetic head according to claim 5, wherein said holder is a pyramid portion of an AFM cantilever, and said main body portion is a cantilever portion of said AFM cantilever.

7. A nano-magnetic head device comprising:
   the nano-magnetic head according to claim 1, 3, 2, 4, 5 or 6, and
   a signal controller which inputs and outputs signals to and from said nano-magnetic head, wherein
      said nano-magnetic head device performs magnetic writing in a nano-region of a magnetic recording medium and reads magnetic record from said nano-region.

8. The nano-magnetic head according to claim 1, 3 or 5, wherein ferromagnetic metal atoms are provided in a hollow portion of said nanotube.

* * * * *